United States Patent [19]

Osterman

[11] Patent Number: 4,535,660
[45] Date of Patent: Aug. 20, 1985

[54] LATHE TAILSTOCK DRIVE ATTACHMENT

[75] Inventor: Daniel E. Osterman, Springfield, Oreg.

[73] Assignee: Pesiri Enterprises, Inc., Springfield, Oreg.

[21] Appl. No.: 501,930

[22] Filed: Jun. 7, 1983

[51] Int. Cl.³ .................. B23B 23/00; F16D 13/54; F16D 21/00; F16H 37/06
[52] U.S. Cl. .................. 82/31; 192/70.25; 192/95; 74/665 A
[58] Field of Search .......... 82/31, 2 R; 192/95, 192/111 B, 70.25, 110 S; 74/665 A, 665 Q, 670

[56] References Cited

U.S. PATENT DOCUMENTS

| 1,326,597 | 12/1919 | Ingle . | |
|---|---|---|---|
| 2,247,562 | 7/1941 | Santen | 71/59 |
| 2,331,385 | 10/1943 | Fritzsch | 82/31 |
| 2,395,586 | 2/1946 | Scott | 82/24 R |
| 2,585,217 | 2/1952 | Bickel et al. | 82/21 B |
| 2,613,777 | 10/1952 | Carlson | 192/70.25 |
| 2,758,691 | 8/1956 | Palm | 192/111 B |
| 2,865,242 | 12/1958 | Kemper et al. | 82/31 |
| 3,198,042 | 8/1965 | Binns | 82/31 |
| 3,331,482 | 7/1967 | Keramas | 192/95 |
| 4,048,881 | 9/1977 | Disston, Jr. | 82/31 |

FOREIGN PATENT DOCUMENTS

| 1268449 | 5/1968 | Fed. Rep. of Germany | 192/95 |
| 489554 | 1/1954 | Italy . | |

Primary Examiner—Francis S. Husar
Assistant Examiner—William E. Terrell
Attorney, Agent, or Firm—James D. Givnan, Jr.

[57] ABSTRACT

A tailstock attachment including a speed controllable motor for driving the feed screw of the tailstock to advance a tool mounted in the tailstock quill into a rotating workpiece. A motor driven pulley is engaged by clutch means which includes a handwheel which may be urged into pulley engagement or instantaneously disengaged therefrom by an over center lock. The lock is adjustable to compensate for clutch wear.

4 Claims, 3 Drawing Figures

LATHE TAILSTOCK DRIVE ATTACHMENT

BACKGROUND OF THE INVENTION

The present invention pertains generally to the tailstock of a machine lathe and the providing of an attachment therefor for the precise, powered advancement of the tailstock quill during a machining operation.

Typically lathe tailstocks are provided with a handwheel and a lead screw rotated thereby. A tool carrying quill in threaded engagement with the lead screw advances or retracts relative the end of a workpiece chucked in the lathe headstock. The rate of feed of the tool toward the workpiece is conventionally controlled by the degree of operator exerted force on the tailstock handwheel. Where repeated or extensive boring operations are performed, considerable physical effort of the operator is required. Further, the operator is required to give his full attention to the entire duration of the machining operation at hand.

The prior art includes mechanisms for the powering of tailstocks as, for example, a hydraulic device wherein a quill is actuated by a hydraulic cylinder provided by metering valves per U.S. Pat. No. 4,048,881. A motor driven lead screw and quill arrangement are shown in U.S. Pat. No. 3,198,042 and function to automatically compensate for thermal expansion or contraction of large lathe mounted workpieces such as metal rolls from which steel plate is rolled. U.S. Pat. No. 2,247,562 discloses an electric motor in direct drive with a lead screw to automatically maintain desired thrust against a workpiece end. Italian Pat. No. 489,554 shows a tailstock adapted for rotation by a lathe drive screw. U.S. Pat. No. 1,326,597 discloses a tailstock center 20 which may be biased into workpiece engagement by a powered shaft in geared connection with the tailstock. A manual clutch includes a handwheel and a nut element for urging the handwheel into engagement with a spur gear rotatably carried on a tailstock lead screw extension.

SUMMARY OF THE PRESENT INVENTION

The present invention is embodied within a tailstock attachment for a tailstock carried tool into workpiece engagement.

The present attachment lends itself to convenient mounting on lathe tailstocks and provides a capability for powering the tailstock of a medium size lathe carried tool for the feeding thereof in a controlled manner toward the workpiece. The speed of the advancement motor is settable to provide lead screw shaft rotation at a speed to effect the feed rate of a quill and tool therein. Thus a machining operation may be automated which heretofore required the full attention of the lathe operator. Setting of the attachment controls effects a uniform rate of feed of the tool which, practically speaking, is not feasible with operator advancement of a tailstock handwheel. A clutch is engaged and disengaged by means of a hand operated cam and when engaged also permits lead screw operation in the conventional manual manner by the tailstock handwheel as well as motor driven screw operation. A control circuit of the attachment motor provides a motor speed control and additionally switch means for reversing and stopping the motor. Accordingly, by varying the motor speed the lead screw and hence the quill advanced thereby may be conveniently and precisely set up for a lengthy machining operation.

Important objectives of the present invention include the provision of a tailstock attachment that is compatible with the tailstocks of a majority of medium sized machine lathes to greatly contribute to the lathe's usefulness by enabling boring operations to be accomplished without the full attention of the lathe operator; the provision of a tailstock attachment that provides for powered movement of a tailstock mounted quill both toward and away from the workpiece at a selected feed rate; the provision of a tailstock attachment that incorporates an over center cam lock which is readily adjusted to compensate for clutch wear; the provision of a tailstock attachment that may be readily attached to a tailstock housing by means of a mouting plate while a powdered coupling of the attachment is engageable with an adapter in place on the tailstock feed screw.

DETAILED DESCRIPTION OF THE PREFERRED EMBODIMENT

Figure 1:
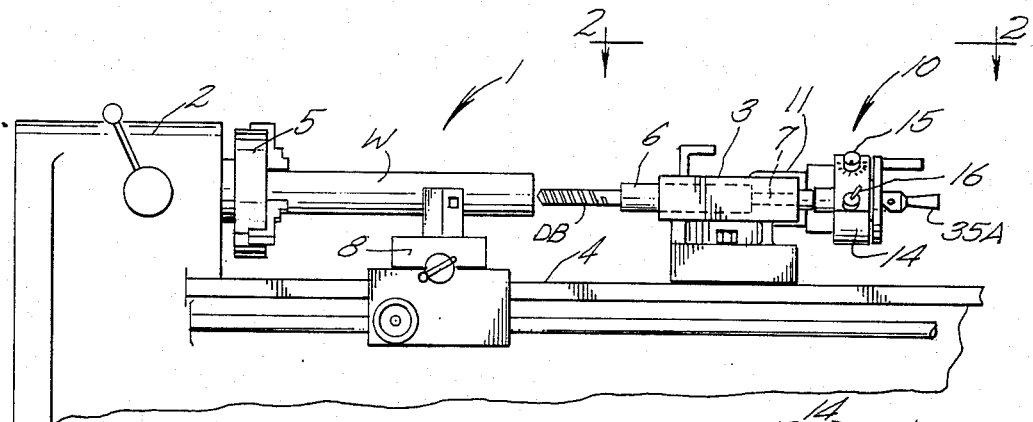
FIG. 1 is a side elevational view of a lathe having a tailstock equipped with the present attachment.
Figure 2:
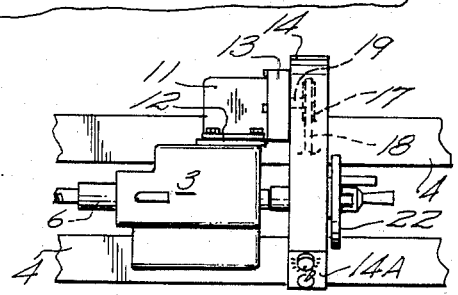
FIG. 2 is a plan view of the tailstock and attachment taken downwardly along line 2—2 of FIG. 1.

With continuing attention to the drawing wherein applied reference numerals indicate parts hereinafter similarly identified, reference numeral 1 indicates a lathe including a headstock 2, a tailstock 3, a bed 4, a rotary chuck 5 and a tool carriage at 8, all of which may be considered typical and of the type found on medium sized machine lathes. Typically, chuck 5 imparts rotary motion to a workpiece W with the tool carriage serving to support a tool engageable along the length of the workpiece. Typically, a tailstock is adjustable and lockable along the bed 4 and serves to support the remaining end of the workpiece for rotation about a center supported in a quill 6. The quill is further positionable by means of a tailstock feed screw 7. A drill bit DB is carried by quill 6.

With attention now to the tailstock supporting the present invention, the tailstock may be of conventional design and accordingly is positioned along the bed or ways at 4 preparatory to the start of a machining operation. Means, not shown, lock the tailstock in the desired bed-supported position. For practising the present invention, a tailstock handwheel is dispensed with to permit coupling of the present attachment of the tailstock feed screw.

The present tailstock attachment is indicated generally at 10 and includes a variable speed, reversible electric motor at 11 for attachment to the back wall of tailstock 3 by means of a motor mounting plate 12. Motor 11 is of the gear head type including a speed reducing unit at 13 which is suitably attached to and partially supports a housing 14. Said housing has a forwardly disposed, inclined frontal surface 14A on which are mounted a motor speed control 15 and a double pole, double throw switch 16 in circuit with motor 11 to control motor operation and direction.

A pulley 17 of an output shaft 19 of the speed reducing unit carries a toothed timing belt 18 which is additionally entrained about a driven pulley component 20 of the belt power transmission means. Driven component 20 includes a bearing 21 permitting pulley overrunning about a later described powered rotary member.

Figure 3:
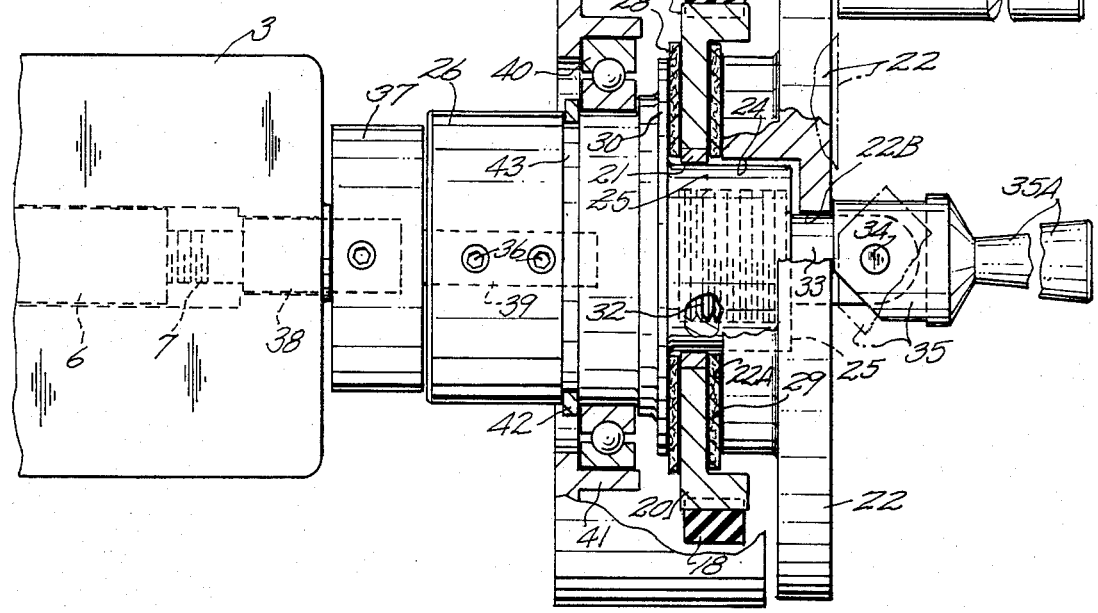
FIG. 3 is a front elevational view of the attachment with fragments broken away for purposes of illustration.

Clutch means includes a handwheel 22 equipped with a handle 23 permitting optional manual rotation of the tailstock feed screw upon clutch engagement as later described. Said handwheel defines an internal bore 24 which receives a boss 25 constituting one end of a powered rotary member at 26. An inner face 22A of the handwheel serves as a pressure plate which may bias a friction disk 29 against the driven component shown as pulley 20 and the latter against a second friction disk 28 and the latter against a flange 30 formed on powered rotary member 26. A handwheel aperture at 22B slidably receives a post 33. Post 33 projects from a threaded stud at 32 which is axially adjustable within boss 25. A manually actuated, over center lock 35 includes a handle 35A for pivoting about a pin 34 to a first or full line position of FIG. 3 to bias handwheel 22 in the manner of a clutch pressure plate toward pulley 20 to engage the clutch disks 28 and 29 with the pulley and powered rotary member 26. A second or broken line position permits disengagement of the clutch components. To compensate for clutch wear threaded stud 32 may be conveniently advanced into boss 25 by rotation of post 33 using handle 35A in its "release" position.

An adapter at 37 is attached to the end 38 of a tailstock feed screw from which the handwheel has been removed. The adapter includes a stem 39 for locking in place within a bore of the powered rotary member by set screws 36.

Housing at 14 is partially supported by a bearing 40 confined by a housing wall 41 and a ring 42 seated in a groove 43 in rotary member 26.

In operation, closure of double pole-double throw switch 16 energizes motor 11 to ultimately drive feed screw 7 of the tailstock with the rotational speed of same being determined by the current flow regulated by control 15. Accordingly, the feed rate of a quill carried tool may be controlled in a precise manner to best suit the boring operation requirements. At the completion of the boring operation quill and tool travel is reversed by moving swith 16 to a motor reversing position. Withdrawal of the tool from the workpiece may be at a greater speed by adjustment of motor control 15. One suitable form of the attachment provides a range of feed rates from zero to four and one-half inches per minute.

The motor is shunt wound D.C., 115 volts 60 Hz.,. The belt drive provides a 2.25:1 reduction to provide a RPM feed shaft speed range of 0.44 to 18.22. Feed rates will vary with the threads per inch of the tailstock feed screw but will range from 0.08 to 4.5 IPM in most tailstocks.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. An attachment for the tailstock of a machine lathe to advance a tool carried by the tailstock feed screw, said attachment comprising, mounting means for securement to the tailstock, a variable speed reversible electric motor and speed reduction means carried by said mounting means, said speed reduction means having an output shaft, power transmission means including a toothed timing belt powered by said output shaft and including a driven component, a powered rotary member for coupling to the feed screw of the tailstock and driveable by said driven component of the power transmission means, clutch means coupling said driven component of the power transmission means and said powered rotary member, said clutch means including an axially positionable handwheel, friction discs, a manually attached cam lock serving to engage said handwheel with said driven component and the latter with said powered rotary member to drive the tailstock feed screw, said cam lock including a threaded stud in threaded engagement with said powered rotary member whereby the cam lock may be adjusted for wear by manual rotation of the threaded stud, said cam lock being of the over center type and including a post, said handwheel carried by said post and axially positionable therealong by said cam lock, a motor speed control and a double pole-double throw switch in circuit with a power source and said motor to control motor speed and hence the rotational speed of the feed screw and rate of axial displacement of a tool carried by said tailstock.

2. An attachment for the tailstock of a machine lathe to advance a tool carried by the tailstock feed screw, said attachment comprising, mounting means for securement to the tailstock, a variable speed reversible electric motor and speed reduction means carried by said mounting means, said speed reduction means having an output shaft, power transmission means powered by said output shaft and including a driven component, a powered rotary member for coupling to the feed screw of the tailstock and driveable by said driven component of the power transmission means, clutch means coupling said driven component of the power transmission means and said powered rotary member, said clutch means including a handwheel slidably mounted on said powered rotary member and constituting a pressure plate, a cam lock of the over center type acting on said handwheel and operable in a first position to urge said handwheel in an axial direction to maintain said driven component in engagement with said powered rotary member, said cam lock having a second position whereat said driven component is disengaged from said powered rotary member, said clutch means including friction discs, a motor speed control and a double pole-double throw switch in circuit with a power source and said motor to control motor speed and hence the rotational speed of the feed screw and the rate of axial displacement of a tool carried by said tailstock.

3. The attachment claimed in claim 2 wherein said cam lock is adjustably mounted on said powered rotary member to enable compensation for clutch means wear.

4. The attachment claimed in claim 3 wherein said cam lock includes a threaded stud in axial threaded engagement with said powered rotary member.

* * * * *